(No Model.)
G. H. VAUGHN.
GARDEN PLOW.
No. 338,119. Patented Mar. 16, 1886.
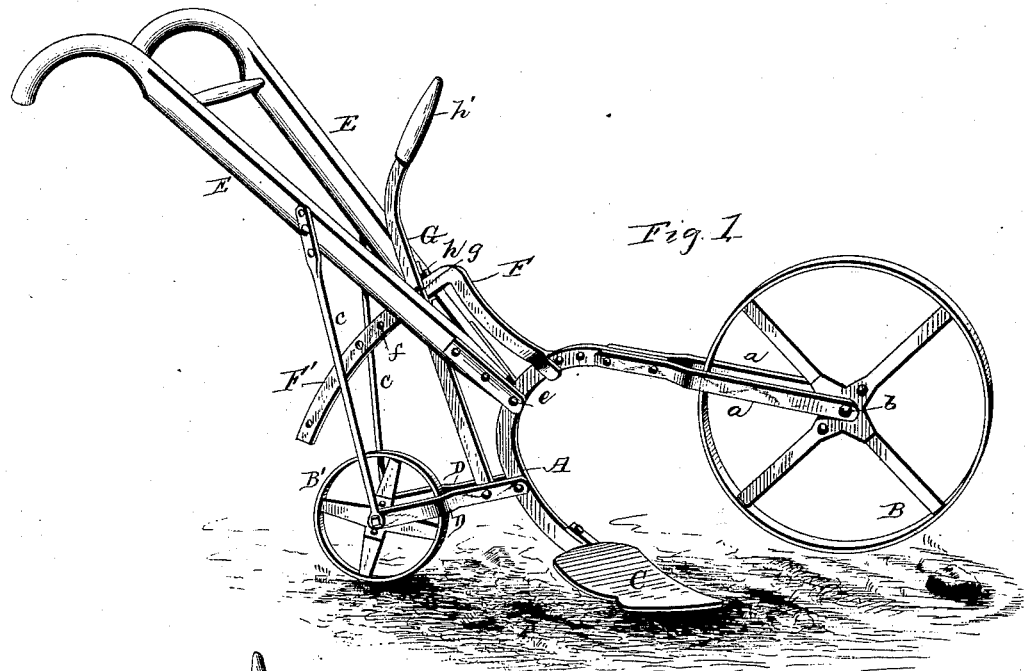
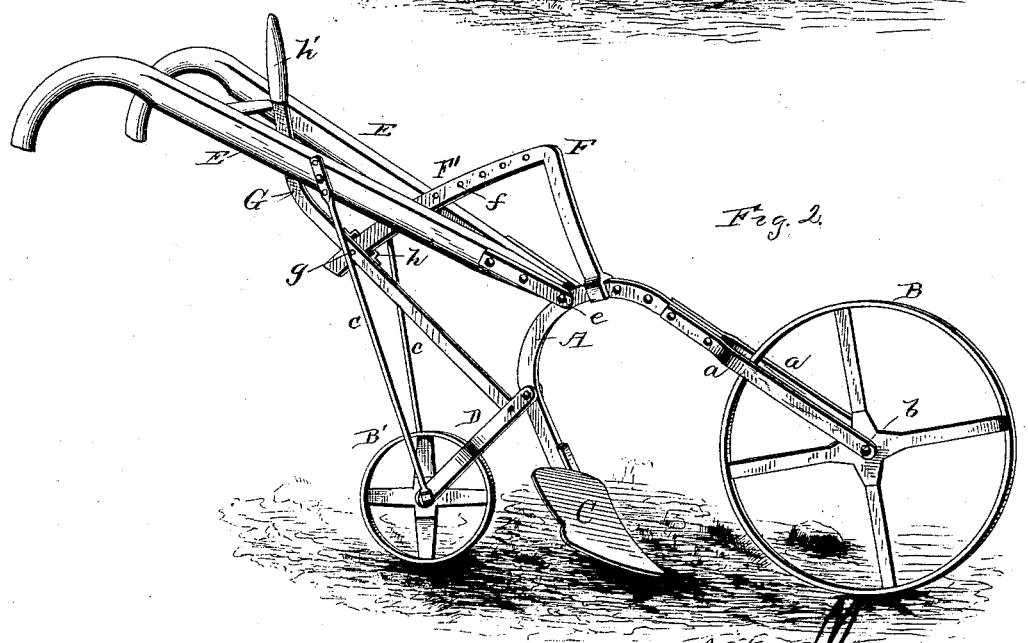
WITNESSES
E. M. Johnson
H. H. Taylor
Gary H. Vaughn INVENTOR
Attorney

UNITED STATES PATENT OFFICE.

GARY H. VAUGHN, OF HANNIBAL, MISSOURI.

GARDEN-PLOW.

SPECIFICATION forming part of Letters Patent No. 338,119, dated March 16, 1886.

Application filed December 3, 1885. Serial No. 184,622. (No model.)

*To all whom it may concern:*

Be it known that I, GARY H. VAUGHN, a citizen of the United States of America, residing at Hannibal, in the county of Marion and State of Missouri, have invented certain new and useful Improvements in Garden-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in garden or hand plows, the object of the same being to provide a means whereby the plow-beam can be adjusted relative to the wheel which follows the plow, so that the depth which the plow enters the ground may be regulated; and to this end my invention consists in the construction and combination of the parts, as will be hereinafter fully set forth, and specifically pointed out in the claims.

In the accompanying drawings, which illustrate my invention, Figure 1 is a perspective view of a garden or hand plow constructed in accordance with my improvement, and showing the parts arranged relative to each other so that the shovel will enter the ground; and Fig. 2 is a perspective view showing the rear wheel depressed so as to raise the plow out of the ground.

A refers to a curved plow-beam, which at its upper end is provided with horizontal projecting side pieces, $a$ $a$, which are rigidly secured to the beam proper, and are perforated at their outer ends for the reception of a bolt, $b$, upon which rotates the front wheel, B.

To the lower end of the plow-beam A, which end is bent slightly forward, is attached the shovel or plow proper, C.

At a slight distance above the shovel C the plow-beam A has pivotally attached thereto arms D D, between which is pivotally attached a wheel, B', and the ends of these arms D D are connected to the plow-handles E by rods or braces $c$ $c$, which are provided with a series of perforations at their upper ends, so that they may be adjustably secured to the plow-handles by a bolt, as shown.

The plow-handles E are of ordinary construction, and are pivotally attached at their forward ends, which converge toward each other, to the plow-beam by a pivot-bolt, $e$.

F refers to an angular or bent arm, which is attached near the upper end of the plow-beam A, and projects upwardly and rearwardly therefrom, the same having formed integral therewith a curved or segmental member, F', which extends downwardly and rearwardly with relation to the plow-beam, said member F' being provided with a series of perforations, $f$, with which engages the bolt $g$, which is carried by the lever G. The lever G is securely attached between the bars D D adjacent to the plow-beam, and it is provided with a bail or loop, $h$, which encircles or passes around the end F' of the bent bar F, and said lever is then bent upwardly, so as to be located between the handles, and is provided with a hand-grasping portion, $h'$. It will be seen by this construction that by moving the lever G the relative position of the wheel B' with relation to the wheel B and plow C will be changed, and this movement of the lever governs the depth of the furrow. By moving the lever G to the lower end of the bent bar F the wheel B' will be depressed, thereby elevating the plow out of the ground, and when the lever is moved in the opposite direction the wheel B' will be elevated and the plow allowed to enter the ground, and to accomplish the end hereinbefore described it is necessary to pivotally connect the plow-beam A to the ends of the handles and to the ends of the bars D D, and in order to provide a further adjustment of the wheel B' the rods $c$ $c$ which brace the same to the handles are also adjustable.

The plow hereinbefore described is adapted and intended to be pushed forward by the person operating the same, though, if desirable, a horse or other animal may be attached to the same.

I claim—

1. In a garden or hand plow constructed substantially as described, a curved beam carrying the plow and front wheel, said beam having pivotally attached thereto handles and arms which carry a small wheel, and lever G, for vertically adjusting the small wheel, substantially as shown, and for the purpose set forth.

2. In a hand or garden plow, the combination of the curved beam A, having rigidly attached thereto a plow, C, and wheel B, said beam carrying a bent bar, F, in combination with the wheel B', pivotally connected to the plow-beam, and provided with a lever which engages with the bent bar F, substantially as shown, and for the purpose set forth.

3. In a hand-plow, the combination of the beam A, wheel B, plow C, and bent arm F', rigidly secured thereto, the wheel B', pivotally connected by arms to the plow-beam and by brace-rods c to the handles, and the lever G, attached to the arms D, and adapted to engage with the bent arm F, substantially as shown, and for the purpose set forth.

4. In a garden-plow, the bent beam A, provided with a wheel, B, and a bent arm, F, which is rigidly attached thereto, and the handles E, pivotally attached to the plow-beam and connected to a wheel, B', by rods c, said rods being pivotally connected to the plow-beam by arms or straps D, to which is connected the end of a lever, G, the parts being organized substantially as shown, and for the purpose set forth.

In testimony whereof I affix my signature in presence of two witnesses.

GARY H. VAUGHN.

Witnesses:
WM. H. DRESCHER,
L. L. HENDREN.